United States Patent [19]

Kuan et al.

[11] 4,045,362
[45] Aug. 30, 1977

[54] DEFLATED TIRE LUBRICANT

[75] Inventors: Tiong H. Kuan, Akron; John G. Sommer, Hudson, both of Ohio

[73] Assignee: The General Tire & Rubber Company, Akron, Ohio

[21] Appl. No.: 666,516

[22] Filed: Mar. 12, 1976

[51] Int. Cl.$^2$ .................. C10M 5/00; C10M 7/00; C10M 1/06; C10M 3/04
[52] U.S. Cl. ............................. 252/14; 252/49.3
[58] Field of Search .......................... 252/14, 49.3

[56] References Cited

U.S. PATENT DOCUMENTS

| | | | |
|---|---|---|---|
| 1,918,187 | 7/1933 | Kirner | 252/14 |
| 3,126,313 | 3/1964 | Johnson | 252/49.3 |
| 3,350,307 | 10/1967 | Brown et al. | 252/49.3 |
| 3,699,057 | 10/1972 | Halko et al. | 252/49.3 |
| 3,826,743 | 7/1974 | Kohls et al. | 252/14 |

FOREIGN PATENT DOCUMENTS 1,017,951  1/1966  United Kingdom ............... 252/49.3

*Primary Examiner*—Delbert E. Gantz
*Assistant Examiner*—Irving Vaughn

[57] ABSTRACT

To facilitate relative movement between the internal surface of a pneumatic tire which comes in contact when the tire is run in a deflated condition, the interior of the tire is coated with a lubricant. An example of the lubricant is as follows:

Lubricant
 a. ethylene glycol base
 b. water
 c. polyethylene oxide
 d. polysaccharide
 e. cellulose fibers.

3 Claims, 1 Drawing Figure

DEFLATED TIRE LUBRICANT

BACKGROUND OF THE INVENTION

1. Field of the Invention

This invention relates to lubricants for pneumatic tires for vehicles and specifically to a lubricant for a tire running while deflated or underinflated.

2. Description of the Prior Art

A basic problem with all pneumatic tires is that they occasionally become underinflated or completely deflated and when this occurs, the tire must be changed and a spare tire put on. In some cases a blowout can cause the vehicle to go out of control.

A tire which can be run flat has for some time been a desirable objective in the tire-making art. If a tire could be run flat for an appreciable distance, the driver could run on the flat tire until a replacement tire was obtained or the tire repaired. This would eliminate changing tires on the road and dependence on a spare. A driver could also run on the suddenly deflated tire until a safe place to stop the car is found, thus avoiding sudden stopping on crowded streets and highways.

There are many problems associated with running a conventional tire flat. A flat tire is unstable, making steering difficult. The lack of inflation pressure causes the tire beads to unseat, and eventually the tire may come off the wheel rim. In addition, riding with a flat tire can be an uncomfortable experience since there is practically no cushion between the wheel rim and the road surface.

A number of designs have been proposed to increase the stability and rideability of the tire when deflated or flat. Some of these proposals, such as U.S. Pat. Nos. 3,394,751 and 3,421,566 relate to movable sidewalls so that the tire tread force is communicated directly to the rim. Other proposals, such as U.S. Pat. Nos. 2,040,645; 3,392,722 and 3,610,308 have special units in the interior of the tire.

A problem generated by tires run flat is the friction which develops from the upper and lower portions of the deflated sidewall rubbing against each other. The friction produces excess heat and causes the sidewalls to wear excessively. To reduce this friction, the inclusion of either liquid or solid lubricants on the tire interiors has been proposed. U.S. Pat. No. 2,040,645, for instance, suggests a graphite lubricant, U.S. Pat. No. 3,610,308 mentions the use of liquid silicone, and U.S. Pat. Nos. 3,739,829 and 3,850,217 describe the use of polyalkylene glycols, glycerol, propylene glycol, silicone and other lubricants. These lubricants, however, are not believed to be as satisfactory as the preferred lubricant of the present invention.

SUMMARY OF THE INVENTION

The lubricant of the present invention is a solution of polymer molecules, with the solution comprising water and ethylene glycol, with the solute comprising small amounts of a polyethylene oxide and a polysaccharide as well as other materials, e.g. sodium nitrite, a corrosion inhibitor and Triton N-101, a wetting agent.

DESCRIPTION OF THE PREFERRED EMBODIMENT

Figure 1:
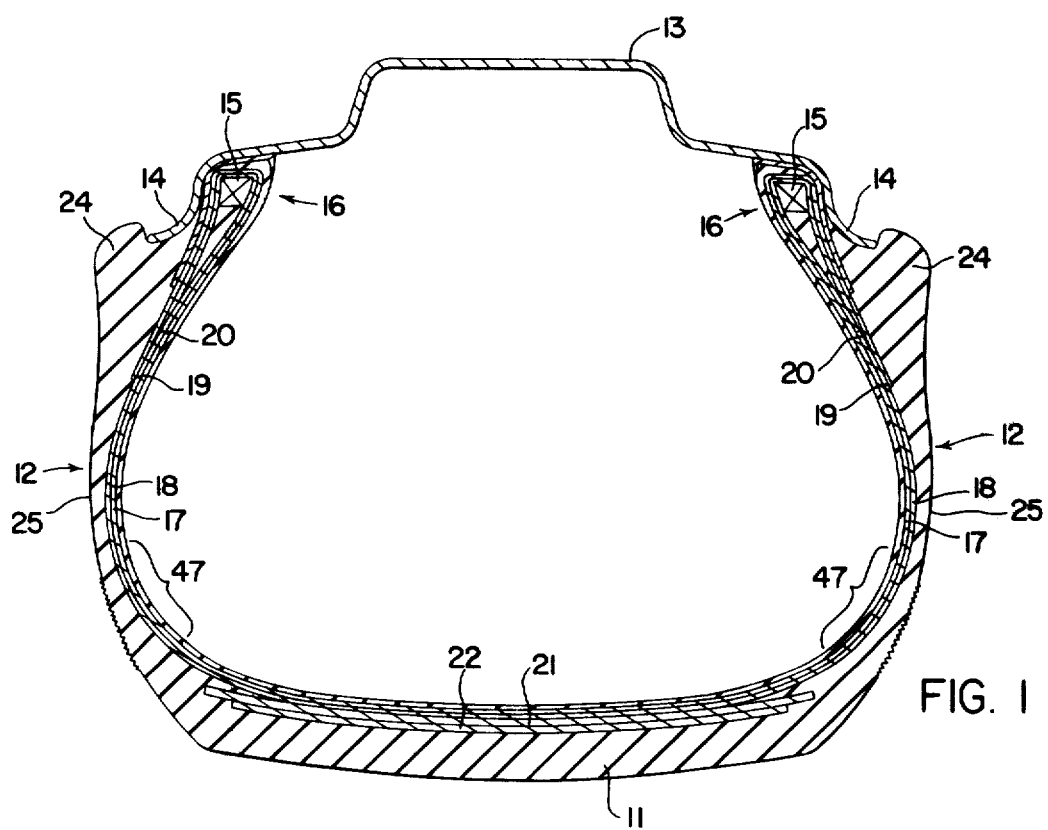
FIG. 1 is a sectional view of a tire of the present invention in its first embodiment.

Referring to FIG. 1, there is shown a pneumatic tire. The tire has a thick tread portion 11 which extends circumferentially around the tire, and sidewalls 12 which extend from the tread portion along the sides of the tire. The tire is designed to be mounted on a conventional wheel rim 13 which has at its outer edges outwardly flared flanges 14 also of conventional design. Wire bead rings 15 are provided in the bead portion 16 of the tire where the sidewall meets the rim 13. In accordance with conventional tire construction, the beads are designed to keep the tire on the rim when the tire is inflated. The inflation pressure of the tire forces the beads 15 against the flange 14, keeping the tire on the rim and maintaining tire inflation.

The tire shown in the drawing may be of the conventional bias/belted or radial type. These tires have two bias or radial plies 17 and 18 extending around the interior of the tire. The plies extend from bead to bead and are folded around the bead rings 15 so that the ends 19 and 20 of the plies are located in the sidewall region. There are also two steel or fabric belts 21 and 22 extending circumferentially around the interior of the tire and located directly interior to the tread portion 11. Conventional rubber compositions are used to form the tread and sidewall portions of the tire and the air-retaining inner liner.

A feature of this particular tire is the circumferential locking lug 24. The lug results from a specially designed increase in the thickness of the sidewall at the end of the rim flange as shown. The locking lug 24 does not interfere with the normal characteristics of the tire when inflated. Upon deflation, however, the locking lug 24 wraps around the flange 14 to secure the tire to the rim 13. Thus, the deflated or flat tire is secured to the rim allowing the tire to be driven flat for a period of time.

The drawing illustrates a size BR78-13 SBR tubeless tire mounted on a standard rim, and it will be understood that a larger tire, such as size HR78-15 could have about the same shape. The rubber used in the tire can be the same as used in conventional tires, in which case the elastic rubber of the sidewall portions could be an SBR rubber with a Shore A durometer hardness in the range of 40 to 80. Butyl rubber can be used in the inner liner to provide maximum resistance to gas permeation.

It is preferable to provide a lubricant on the interior surface of the sidewall portions at 47 to reduce the friction and heat generated by the rubbing of the upper and lower halves of the sidewalls when they are in contact during operation of the deflated collapsed tire. The viscous lubricant employed has excellent lubricity, a viscosity which does not change appreciably as the temperature is increased from 25° to 85° C, and stability when operated for long periods of time at high radial accelerations such as 200 g's or higher.

The lubricants preferred for use in the present invention have excellent lubricity, are compatible with the rubber of the inner liner of the tire, are stable and operable over a wide range of temperatures and shear rates, have a viscosity and composition such that the ingredients remain uniformly distributed in service, and have puncture-sealing capability.

Prior to this invention there were no lubricants which met all of these requirements. The preferred lubricant as disclosed hereinafter meets all of these requirements.

The preferred lubricant of this invention comprises a high molecular weight polymeric material dissolved in a solvent, such as water, and having high viscosity in the temperature range of 25° to 90° C. The molecular weight of the polymer is at least 10,000 and preferably at least 50,000. A mixture of polymers is preferably employed to provide a puncture-sealing lubricant with a high viscosity at 25° C. (such as 100,000 centipoises or more) which is not much higher (for example, no more than 10 percent higher) than the viscosity at 85° C. This can be accomplished by employing a small amount, usually less than 2 percent by weight, of a water-soluble gum or polysaccharide as described hereinafter. The polysaccharide may have a molecular weight of 10,000 to 50,000 or more.

The high polymer used with the polysaccharide preferably imparts good elastic properties to the solution and is selected to provide good lubricity. Excellent results are obtained using water-soluble high polymers such as polyethylene oxides with a high molecular weight of at least 10,000 and preferably 50,000 to 5,000,000, such as "Polyox WSR 205", "Polyox WSR 301" and other conventional polyethylene oxide polymers.

The water-soluble gums or polysaccharides are employed because of their low viscosity-temperature coefficient. Suitable polysaccharides for use in this invention are pentosans $(C_5H_8O_4)n$, hexosans $(C_6H_{10}O_5)n$, gums, mucilages, derivatives thereof, and the like and include starches, methyl celluloses and other celluloses, hemicelluloses, modifications and derivatives thereof, and similar water-soluble high polymers. The molecular weight can be 50,000 to 300,000 or higher. A large number of different water-soluble gums or polysaccharides can be used which are described in more detail in the textbook "The Chemistry of Plant Gums and Mucilages" by F. Smith and R. Montgomery, copyright 1959 by Reinhold Publishing Corporation. Suitable water-soluble polysaccharide gums and mucilages include Xanthan gum, gum arabic, many other natural and synthetic gums and mucilages, derivatives thereof and the like as described, for example, in said textbook. The monosaccharide building units of the gums, mucilages and vegetable polymers may be of different types and may, of course, be modified in various ways without destroying the usefulness of the polymers.

When the water-soluble polymers described above are dissolved in water, they behave uniquely and tend to assume voluminous configurations which lead to a tremendous increase in solution viscosity. It has been found that when two polymers, such as polyethylene oxide and a polysaccharide, are dissolved in a mixture of water and ethylene glycol, an unexpected synergism is achieved and a high-viscosity puncture-sealing lubricant is obtained having excellent lubricity and the ability to function well over a wide range of temperatures and shear rates.

The preferred lubricant of this invention may be made by mixing at least 20 parts by weight of water with not more than 80 parts by weight of ethylene glycol, about 0.05 to about 3 parts and preferably 0.05 to 1.5 parts by weight of a very high molecular weight polyethylene oxide, and about 0.05 to about 4 and preferably no more than 2 parts by weight of a high molecular weight polysaccharide. The lubricant may also contain a very small amount of an antioxidant and small amounts of other ingredients. It preferably contains cellulose fibers or other suitable filler in an amount such as 3 to 8 percent by weight and preferably 4 to 6 percent by weight. The fibrous filler may comprise fibers with a length from 20 to 400 microns, for example.

The preferred lubricant employs water and ethylene glycol, about 0.05 to about 2 percent by weight of the polyethylene oxide polymer, about 0.15 to about 2 percent by weight of the polysaccharide, and about 4 to about 6 percent by weight of cellulose fibers. With respect to the water-ethylene glycol mixture, the major portion of the mix should be ethylene glycol to minimize volatile loss. Synergism is indicated, as shown by the examples which follow, because the viscosity-temperature coefficient of the composite solutions is lower than the individual polymer solutions containing the same amount of fibers. In addition, the lubricant can be compounded so that the viscosity is relatively insensitive to temperature variation in the range of 25° to 85° C.

The polymers and ingredients of the lubricant are selected to provide a viscosity (Brookfield) suitable for the effect desired. For good lubricity the viscosity should be at least 1,000 centipoises at 25° C. Where good puncture-sealing properties are also desired, the viscosity may be 100,000 to 400,000 centipoises at 25° C. The viscosity may be such that the ingredients of the lubricant remain uniformly distributed during service and is preferably such that they remain properly distributed when the lubricant is continuously subjected to 200 g's at 70° C. for 20 hours or more.

The total amount of the polysaccharide and the water-soluble resin may be very small where the molecular weight is very high and is usually no more than 5 percent by weight. However, more may be required to obtain the desired viscosity if a lower molecular weight is employed. For example, the amount of Polyox WSR 205 with a molecular weight of 600,000 may be 2 to 4 percent by weight as compared to 1 percent or less of a similar polymer having a molecular weight of 1 to 5 million.

A series of polymer solutions were prepared for testing using formulations A, B, C and D indicated below:

Table I

| Ingredient | Parts by Weight | | | |
|---|---|---|---|---|
| | A | B | C | D |
| Ethylene glycol | 50 | 50 | 50 | 50 |
| Water | 50 | 50 | 50 | 50 |
| Polyethylene oxide | — | 0.75 | 0.75 | 0.75 |
| Polysaccharide (KELZAN) | 1.5 | — | 0.95 | 1.5 |
| Solka Floc SW 40 | 4.0 | 3.0 | 3.0 | 3.0 |
| Solka Floc BW 200 | 2.0 | 1.5 | 1.5 | 1.5 |

The viscosity of the polymer solutions was measured at 25° and 88° C. using a conventional Brookfield viscometer, model LVT with the following results:

Table II

| Viscosity (centipoises) | A | B | C | D |
|---|---|---|---|---|
| at 25° C. | 183,000 | 8,150 | 195,000 | 290,000 |
| at 88° C. | 154,000 | 2,475 | 170,000 | 301,000 |
| Percent change | −16% | −69% | −13% | +3.8% |

In the formulations A to D, the polyethylene oxide was Polyox WSR 301 made by Union Carbide and the polysaccharide was "KELZAN" Xanthan gum made by Kelco Corporation. Such polyethylene oxide has a molecular weight of around 4 million.

Solka Floc is made by DiCalite Division of GREFCO and comprises conventional cellulose fibers. SW 40 fibers are about 100 microns long and about 16 microns thick. BW 200 fibers are about 50 microns long and about 17 microns thick.

The wetting of the inner liner by the lubricant has not been a problem. However, it has been found that some additives effect a significant decrease in the surface tension of the lubricant and hence better wetting. Such a material is Triton N 101, a nonyl phenoxy polyethoxy containing 9 to 10 mols of ethylene oxide manufactured by Rohm and Haas.

As shown in Table II, the polymer solution B containing just polyethylene oxide exhibits a drastic reduction in viscosity upon heating while the polymer solutions C and D containing a small fraction of the polysaccharide are almost temperature insensitive.

The coefficient of friction of a typical vulcanized radial-type inner liner compound sliding against itself was measured first in the absence of a lubricant, then in the presence of a silicone-graphite lubricant, and finally in the presence of the above polymer solution lubricant C. The results are shown below:

Table III

| Lubricant used | Static Friction Coefficient | Dynamic Friction Coefficient |
|---|---|---|
| No lubricant | 0.92 | 0.85 |
| Silicone-graphite lubricant | 0.20 | 0.12 |
| Polymer solution lubricant | 0.07 | 0.06 |

The results indicate that the polymer-solution lubricant is about twice as effective as the silicone-graphite and that it reduces the coefficient of friction by a decade or a factor of 10.

In addition to favorably affecting the rheological behavior of the lubricant, the addition of the cellulosic fibers imparts puncture-sealing capability to the lubricant. The lubricant can successfully seal a puncture in a subscale tire resulting from a 6-penny nail. Leakage of air can occur upon puncturing with larger size nails; however, the puncture sites become covered with small amounts of the lubricant, and leakage is reduced.

The viscosity of the lubricant is essentially unaffected by shearing when sheared at a rate of 30 sec$^{-1}$ for 2½ hours.

The cellulose fibers remain suspended under the influence of centrifugal force equivalent to a tire running at about 50 mph (about 80 km/hr). After subjecting each of the lubricants C and D to a large centrifugal force of about 220 g's at a temperature of 71° C. for 24 hours, the lubricant remained a uniform solution with the fibers still uniformly dispersed. Similar testing of the lubricant B without polysaccharide, on the other hand, resulted in a nonuniform distribution of the fibers.

The lubricant does not swell the inner liner compound of a typical radial tire. Samples of a radial tire inner liner compound and urethane compound were immersed into a lubricant solution for more than 2 weeks at 50° C. Negligible change in the samples' dimensions was observed.

Three size BR78-13 steel radial tires were coated with the lubricant formulation set out below. About 454 (one pound) grams was used for each tire. These tires, except for the sidewall which had a higher than usual stiffness, were built to a commercial specification. Two similar tires were used as controls. The valve stems were removed so that the tires would not hold air. They were mounted on 5 inch rims and run at a speed of 25 mph on a pulley wheel with an applied load of 784 lbs. (355.9 kg.). Table IV below sets out the number of miles to failure in run flat condition. It can be seen that the tires containing the lubricant ran substantially more miles than those without the lubricant.

Table IV

| Tire No. | Lubricant | Bead Lock Mechanism | Miles to Failure in Run-Flat Condition |
|---|---|---|---|
| 1 | No | Rim well band | 21 |
| 2 | No | Machine screws | 19 |
| 3 | Yes | Machine screws | 43 |
| 4 | Yes | Machine screws | 42 |
| 5 | Yes | Rim well band | 48 |

The lubricant solution used in the above tires was prepared using the formulation set out below:

| Ingredient | | |
|---|---|---|
| ethylene glycol | 70 | parts |
| water | 30 | parts |
| polyethylene oxide WSR 101 | .05 | parts |
| polyethylene oxide WSR 205 | .03 | parts |
| Kelzan | 0.15 | parts |
| Triton N-101 | 10.0 | parts |
| Sodium metasilicate | .075 | parts |
| Sodium Nitrite | .075 | parts |
| Diethylene triamine | .01 | parts |
| Thiourea | .01 | parts |
| Total parts | 110.4 | |

To further demonstrate the efficacy of the lubricant of the present invention, a further series of tires size BR78-13 Dual Steel II radial tires manufactured by The General Tire & Rubber Company were coated with a solution of the above lubricant of the invention. In each instance the tire was mounted on the right front of a Vega automobile at the load specified in the table below. The rim well band was made of rubber and it fit snugly in the rim well, thus preventing the bead from unseating. In one instance as a control, a tire with no lubricant was used. The valve was removed and the test commenced without any tire warm-up period. The endurance mileage of each tire is shown in the table below:

Table V

| Tire No. | Load, lbs. | Amount of Lubricant | Bead Locking Mechanism | Endurance Mileage |
|---|---|---|---|---|
| 1 | 970 | None | Rim well band | 25.3 |
| 2 | 970 | 1 lb. | Machine screws | 49.9 |
| 3 | 970 | 1 lb. | Rim well band | 70.9 |
| 4 | 970 | 1 lb. | Machine screws | 42.9 |
| 5 | 970 | 2 lbs. | Machine screws | 65.6 |
| 6 | 1080 | 1 lb. | Rim well band | 22.7 |
| 7 | 1080 | 2 lbs. | Rim well band | 28.8 |

The lubricant is serviceable over a broad temperature range, from about −35° to about 110° C. This range can be further extended easily by increasing the ethylene glycol content of the lubricant at the expense of water with minimum anticipated effects on the other properties.

As used herein and in the claims, the term "high polymer" refers to polymers having a very high molecular weight, such as 50,000 or more, and the term "water-soluble", as applied to the gums, mucilages and other polymers, indicates that the polymer is either dissolved or that it swells to form a viscous solution.

Unless the context shows otherwise, "parts" means parts by weight and all percentages are by weight.

The invention as shown herein is applied to a conventional bias-belted or radial tire construction; however, it is understood that the invention can be practiced with other standard designs of tires. While the invention has been shown and described with respect to specific embodiments thereof, these are intended for the purpose of illustration rather than limitation, and other modifications and variations will be apparent to those skilled in the art all within the intended spirit and scope of the invention.

We claim:

1. A stable lubricant for a pneumatic tire for use when the tire is operated in an uninflated or deflated condition, said lubricant comprising:
   a. 100 parts of a water/ethylene-glycol mixture wherein there is at least one part of water for every 4 parts of ethylene glycol;
   b. from about 0.05 to about 2 parts by weight of a polyethylene oxide of a molecular weight of about 500,000;
   c. from about 0.15 to about 2 parts by weight of a polysaccharide having a molecular weight of at least about 10,000; and
   d. up to 8 parts by weight of cellulose fibers, said fibers having a length not more than 400 microns;
   a lubricant of a viscosity such that the fibers will remain dispersed when the tire is subjected to 200 g's at 70° C.

2. The lubricant of claim 1 wherein the polysaccharide and the polyethylene oxide are dissolved in an aqueous solution which is compatible with the adjacent rubber portions of the tire.

3. The lubricant of claim 1 wherein the viscosity at 25° C. is no more than 10 percent greater than the viscosity at 85° C. and is capable of maintaining proper dispersion of the filler when subjected to 200 g's at 70° C.

* * * * *